United States Patent
McIntosh

(10) Patent No.: US 6,471,182 B1
(45) Date of Patent: Oct. 29, 2002

(54) CONTROL VALVES FOR HEATING AND COOLING SYSTEMS

(76) Inventor: Douglas S. McIntosh, #505-373 Laurier East, Ottawa, Ontario (CA), K1S 2C5

( * ) Notice: Subject to any disclaimer, the term of this patent is extended or adjusted under 35 U.S.C. 154(b) by 0 days.

(21) Appl. No.: 09/912,986

(22) Filed: Jul. 25, 2001

(51) Int. Cl.[7] ............................................. F16K 31/04
(52) U.S. Cl. ........................ 251/129.12; 251/249.5
(58) Field of Search ...................... 251/129.04, 129.11, 251/129.12, 248, 249.5

(56) References Cited

U.S. PATENT DOCUMENTS

| | | | | |
|---|---|---|---|---|
| 4,338,961 A | * | 7/1982 | Karpenko | 251/133 X |
| 4,807,664 A | * | 2/1989 | Wilson et al. | 137/624.11 |
| 6,032,924 A | * | 3/2000 | Castle | 251/129.12 |
| 6,276,664 B1 | * | 8/2001 | Keller | 251/129.12 |
| 6,371,440 B1 | * | 4/2002 | Genga et al. | 251/129.11 X |

* cited by examiner

Primary Examiner—Kevin Lee

(74) Attorney, Agent, or Firm—Francis C. Hand; Carella, Byrne et al

(57) ABSTRACT

An actuator for opening and closing a globe valve. The globe valve has a stem through which positioning of the globe valve is achieved. The globe valve is normally biased to open position. The actuator comprises an electric motor which drives a worm and pinion arrangement. The pinion drives an output gear which gear is movable between a base and a raised position within a frame and held in the base position by a compression spring with a similar compression rating to that of the required valve shutoff. The output gear drives a worm stem bearing against the stem of the globe valve to move it against its bias in one direction to close the globe valve. The output gear and worm stem are arranged so that, when the globe valve is fully closed, the worm stem is at its extreme position in that one direction and the output gear then begins to move within its frame from its base to its raised position. A shoulder on the output gear simultaneously moves a first leaf spring to break contact with a first switch and turn off the electric motor with the valve in closed position. In the opposite direction, the output gear returns to its base position and then moves the worm stem in an opposite direction to a position where the worm stem moves a second leaf spring to break contact with a second switch to turn off the electric motor with the valve in open position.

7 Claims, 2 Drawing Sheets

CONTROL VALVES FOR HEATING AND COOLING SYSTEMS

FIELD OF THE INVENTION

The present invention related to an actuator for use with small globe valves used to control fluid movement in heating and cooling systems.

BACKGROUND OF THE INVENTION

Small electric and electronic control valves are in use in thousands of applications, primarily with hot or chilled water for the control of temperature but also for humidity, etc. and also for other mediums such as steam, glycol, heat-transfer oils, etc. In all cases, the main problems are cost, silence of operation (since they are located in or close to the occupied suites), and that they be compact (since they are usually located in confined cabinets, etc.). They replace the older pneumatic valves previously used in heating and cooling systems by that industry a decade or two ago.

The problems which plague the manufacturers are many, including, the cost of manufacture, the quietness of the miniature gear trains, detecting and stopping the actuator at the correct force and/or protecting the overload of the motor or valve, and stopping by a switch the actuator at the full open position, particularly with respect to the cost of the switches themselves, and the mechanical force balancing system necessary to detect the force applied by the actuator.

Other requirements often involve providing a spring to drive the motor open or closed in the event of a power failure for safety reasons as for example, described in my U.S. Pat. No. 6,100,655 issued Aug. 8, 2000.

Common current solutions to these problems involve the installation of a magnetic clutch in the gear train. Over a given torque, the gear train slips, allowing the motor to continue running without further strain. Often this helps with the problem of noise as well, since the impact of the small teeth does not travel through the gear train as much To stop the motor, a thermostatic device, usually a computer-based device, is programmed only to run for a few minutes to assure that the valve will be fully closed or fully open, etc. The run time programmed is just greater than the run time of the actuator. This eliminates the end switches and load sensing devices otherwise needed, although it incurs other complications and other problems (since some computer based systems constantly jog the actuator to check the position, closed or open etc., and constantly drive wear their primary gears, energizing the motor every 2 or 6 minutes year 'round promoting wear and tear).

Other methods of detecting high load are possible with certain motors where the amperage of the motor is proportional to load and an electronic detecting circuit is arranged to shut the motor. In these cases, constant checking of status causes the motors to burn out.

The design of the motor described herein differs in that it still achieves low cost of production, but it operates quietly without clutches, etc. It is inexpensive to build (once the tooling is amortized), and it actually shuts off and stays so without the need to constantly jog the motor since it also inherently provides a feedback circuit to transmit the open/closed positions of the control valve, an important need in today's automated systems.

SUMMARY OF THE INVENTION

In accordance with the present invention there is provided an actuator for opening and closing a globe valve. The globe valve has a stem through which positioning of the globe valve is achieved. The globe valve is normally based to open position. The actuator comprises an electric motor which drives a worm and pinion arrangement. The pinion drives an output gear which gear is movable between a base and a raised position within a frame and held in the base position by a compression spring with a similar compression rating to that of the required valve shut off. The output gear drives a worm stem bearing against the stem of the globe valve to move it against its bias in one direction to close the globe valve. The output gear and worm stem are arranged so that, when the globe valve is fully closed, the worm stem is at its extreme position in that one direction and the output gear then begins to move within its frame from its base to its raised position. A shoulder on the output gear simultaneously moves a first leaf spring to break contact with a first switch and turn off the electric motor with the valve in closed position. In the opposite direction, the output gear returns to its base position and then moves the worm stem in an opposite direction to a position where the worm stem moves a second leaf spring to break contact with a second switch to turn off the electric motor with the valve in open position.

In a preferred embodiment, the motor and first and second switches are mounted on a printed circuit card together with a power source. The printed circuit card is arranged with appropriate circuitry for running the motor.

The actuator according to the present invention is so quiet as to be undetectable to the average human ear. It uses no slipping clutches, requires no "time out" circuits or software, is not affected or worn by jogging or computer check-position pulses and is not dependent on electronic load detecting (theoretically force detecting) circuits and software.

BRIEF DESCRIPTION OF THE DRAWINGS

These and other objects and advantages of the invention will become apparent upon reading the following detailed description and upon referring to the drawings in which.

Figure 1:
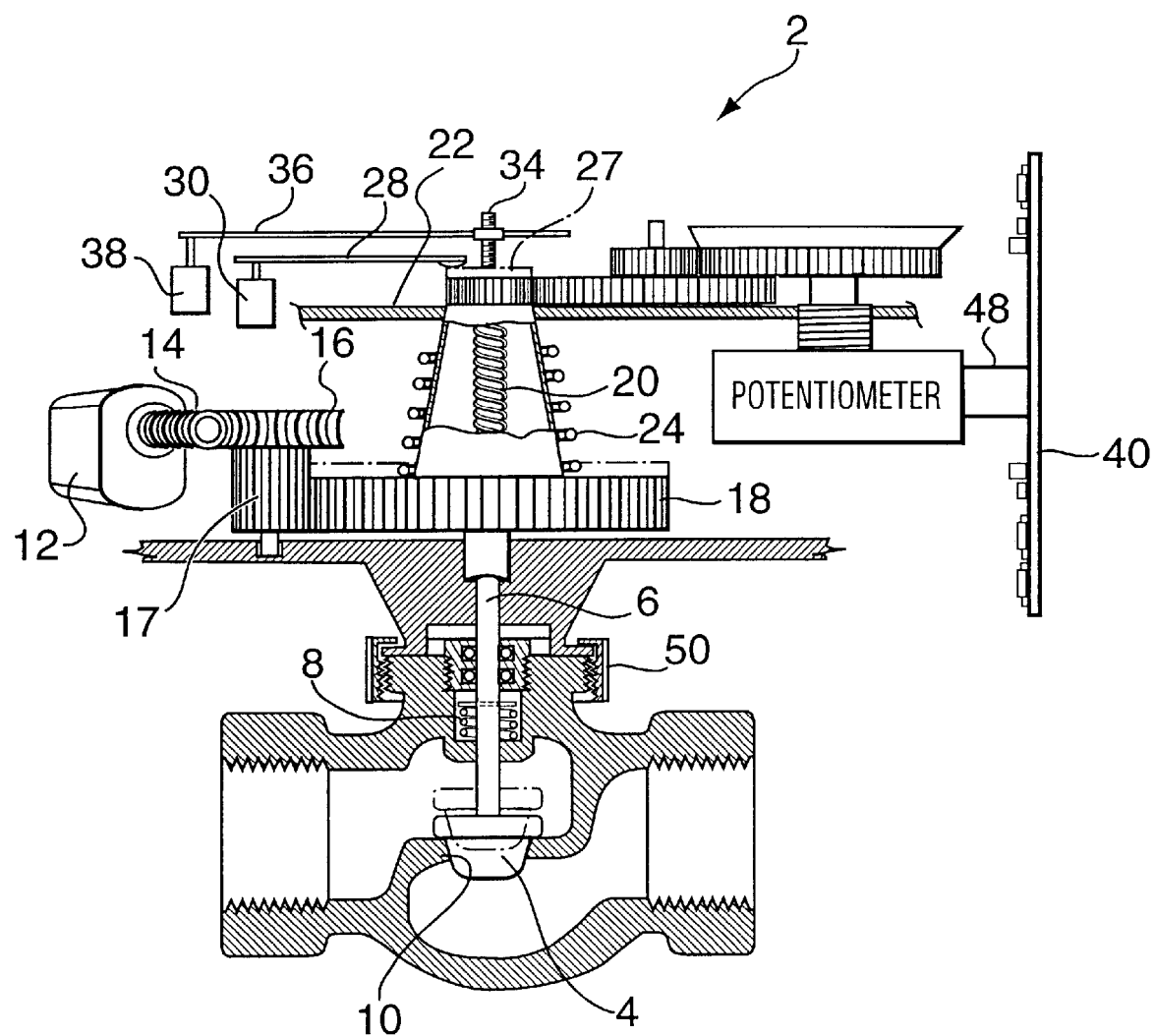
FIG. 1 is a schematic view in partial section of the actuator according to the present invention, showing its principle of operation.

While the invention will be described in conjunction with an illustrated embodiment, it will be understood that it is not intended to limit the invention to such an embodiment. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1 there is illustrated an actuator 2 in accordance with the present invention for opening and closing a globe valve 4, the globe valve having a stem 6 through which positioning of the globe valve is achieved. Spring 8 biases globe valve to open position with respect to globe valve seat 10.

An electric motor 12 drives a worm 14 and, in turn, wheel 16 of a cluster gear. Pinion 17 of the cluster gear in turn drives output gear 18 which is centrally disposed about, and drives output worm stem 20.

Output gear 18 is located within a frame 22 and held in a base position by compression spring 24. Spring 24 has a similar compression rating as the required shut off force required for globe valve 4. As soon as the downward force of worm output worm stem 20 matches or exceeds that required for shut off for globe valve 4, output gear 18 begins to rise within its frame 22, away from its base position on output worm stem 20 which itself is seated on the upper portion of stem 6 of globe valve 4 as illustrated. As output gear 18 rises, its shoulder 27 bears against a portion of leaf spring 28, whereupon micro-switch 30, usually engaged by leaf spring 28, becomes disengaged, bringing motor 12 to a stop. Spot micro-switch 30 now makes contact with its other contact to transmit the valve's closed position status. Should the unit be constantly "jogged" by "time out" pulses or other, motor 12 is not affected since it has been switched off at the correct stem force as measured by the "force" spring 24.

In the opposite direction, output gear 18 backs down into its base position on frame 22, and then begins to lift output worm stem 20 upwards. When output worm stem 20 lifts to a prescribed highest limit, it hits an adjustment screw 34 on a second leaf spring 36 which in turn lifts its respective top end switch, second micro-switch 38, to shut off motor 12 at the prescribed height. This prescribed height by the uppermost position of valve 4 might be in inches/mm, or it might be to the maximum valve capacity needed to prevent starvation in other areas of a building, as in water balancing programs. Again, should the unit be constantly "jogged" by "time out" pulses or other, the motor is not affected since it has been switched off at the "maximum open" height and, in fact, this actuator, according to the present invention, eliminates the need for time-out programs and resultant software requirements.

Figure 2A:
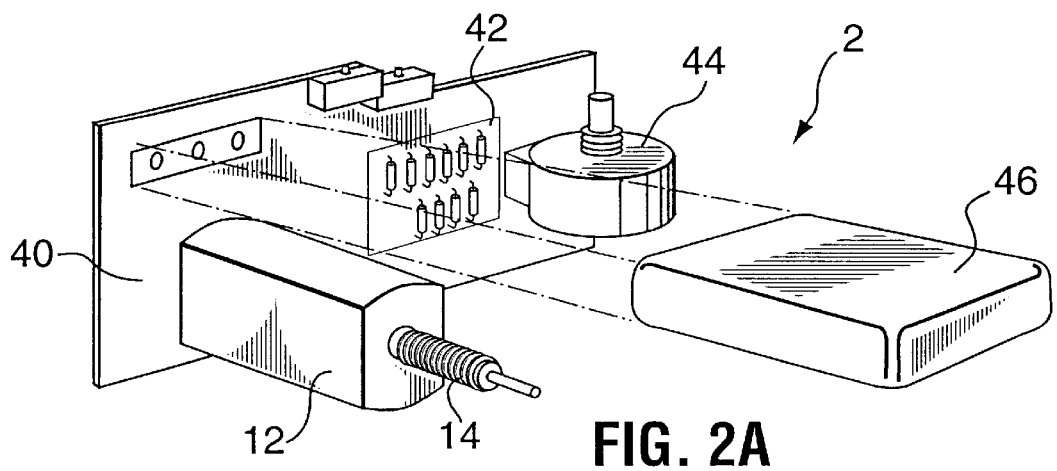
FIGS. 2A, 2B, and 2C are perspective views of the actuator of FIG. 1, in progressive stages of assembly.
Figure 2B:
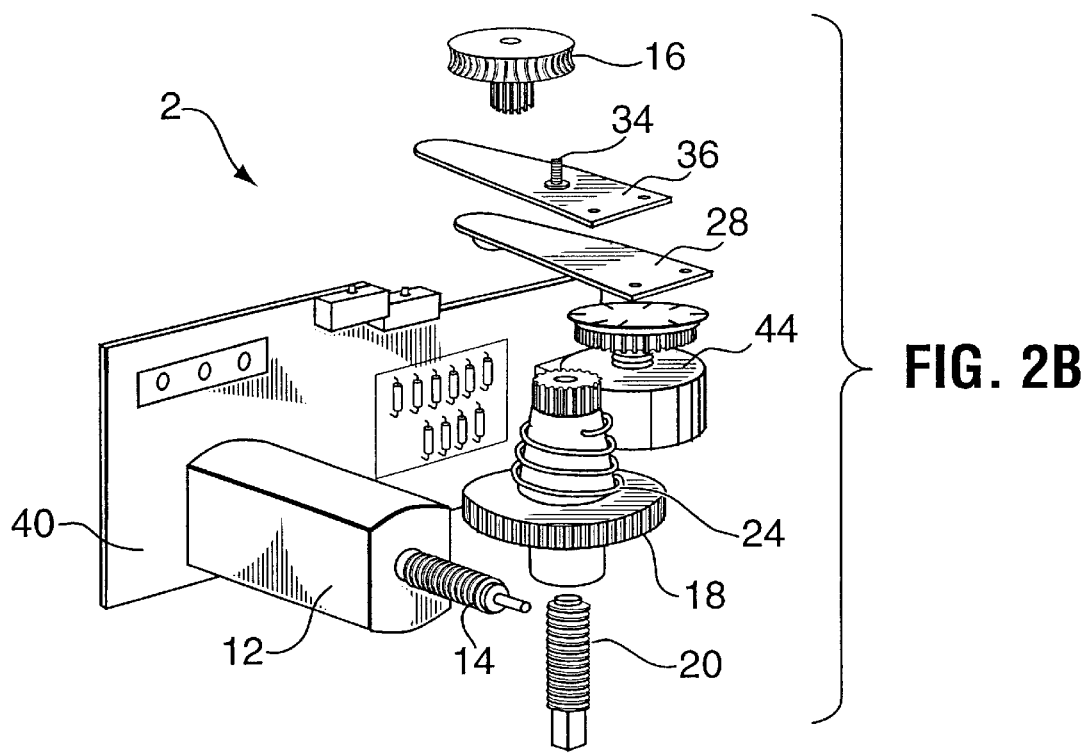
Figure 2C:
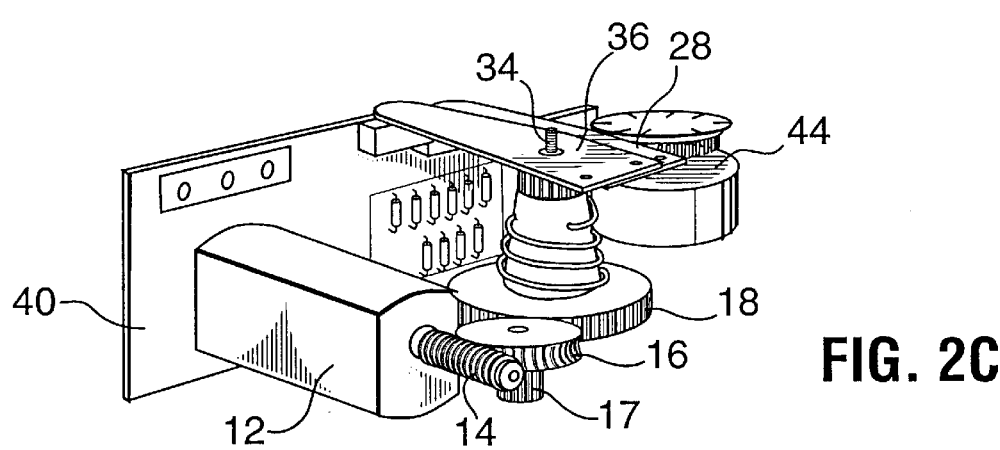

As can be seen in FIGS. 2A, 2B and 2C, the various components of actuator 2 are carefully positioned so that they are soldered directly to a common printed circuit board 40. This facilitates manufacture-without-wire (other than the output wire), enabling all components to be pre-assembled and installed in a wave soldering machine. It will be noted that printed circuit board 40, in FIG. 1, is shown schematically to the right-hand side. This view clarifies the components but, in fact, motor 12 switches and 30 and 38 and other components are all located on the common circuit board 40.

Further, in FIGS. 2A, 2B, and 2C, for clarity, these drawings do not show upper frame 42 or the lower frame.

Electronic logic circuitry 42 is included on a circuit board 40, and associated with a conventional feedback potentiometer 44 which in turn is associated with the micro-switches to dictate where the valve is, for example for modulating circuits. A power pack 46 in the form of a battery pack or capacitors may also be mounted on circuit board 40 (for use during power failures to control or drive the valve to a safe position—open or closed).

The actuator in accordance with the present invention operates quietly without clutches etc. Instead of a complex multi-reduction gearbox, the primary motor 12 (AC or DC) drives the worm 14 and through pinion 17 in turn, the output gear 18 directly, with its output worm 20. The double worm action (worm in; worm out) eliminates much complex gearing.

The actuator 2 in accordance with the present invention physically matches the size of conventional units now in the market place, and is even smaller than some. It provides a thumbnut connection 50 (FIG. 1) which is similar or exactly the same as current units, allowing it to mate with a myriad of valves for in current production in Europe and North America. Actuator 2 is designed to accurately measure the actual force as opposed to theoretical force, and shuts off the motor 12 with actual switches 30 and 38, and transmits position with those switches, yet it is still inexpensive to build.

Thus, it is apparent that there has been provided in accordance with the invention a control valve for heating and cooling systems that fully satisfies the objects, aims and advantages set forth above. While the invention has been described in conjunction with an illustrated embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. An actuator for opening and closing a globe valve, the globe valve having a stem through which positioning of the globe valve is achieved, the globe valve being normally biased to an open position, the actuator comprising an electric motor which drives a worm and pinion arrangement, the pinion driving an output gear movable between a base and a raised position within a frame and held in the base position by a compression spring with a similar compression rating to that of the valve shutoff, the output gear driving a worm stem bearing against the stem of the globe valve to move the stem against its bias in one direction to close the globe valve, the output gear and worm stem arranged so that:

(a) when the globe valve is fully closed, the worm stem is at its extreme position in said one direction and the output gear then begins to move within its frame from its base to its raised position, a shoulder on the output gear simultaneously moving a first leaf spring to break contact with a first switch and turn off the electric motor with the valve in the closed position; and (b) in the opposite direction, the output gear returns to its base position and then moves the worm stem in an opposite direction to a position where the worm stem moves a second leaf spring to break contact with a second switch to turn off the electric motor with the valve in the open position.

2. An actuator according to claim 1 for a direct action globe valve, wherein the globe valve is biased to the open position by said compression spring.

3. An actuator according to claim 1 arranged so that when the first leaf spring breaks contact with the first switch, said first switch is arranged to signal the valve's closed position.

4. An actuator according to claim 3 arranged so that when the second leaf spring breaks contact with the second switch, said second switch is arranged to signal the valve's open position.

5. An actuator according to claim 1, wherein the motor and first and second switches are mounted on a printed circuit card together with a power source, the printed circuit card arranged with circuitry for running the motor.

6. An actuator according to claim 5, wherein the circuit board is further provided with a potentiometer to provide feedback from the output gear and worm stem positions, to transmit the position of the valve.

7. An actuator for opening and closing a globe valve, the actuator comprising a printed circuit board on which is mounted a motor, a first and second switch, an electronic logic circuitry and a potentiometer, the circuit board to receive power from a power source, the motor driving a worm and pinion, the pinion driving an output gear movable between a base and a raised position within a frame and held in position by a compression spring with a similar compression rating to that of the valve shutoff, the output gear driving a worm stem bearing against the stem of the globe valve to move the stem against its bias in one direction to close the globe valve, the output gear and worm stem arranged so that:

(a) when the globe valve is fully closed, the worm stem is at its extreme position in said one direction and the output gear then begins to move within its frame from its base to its raised position, a shoulder on the output gear simultaneously moving a first leaf spring to break contact with the first switch and turn off the electric motor with the valve in the closed position; and (b) in the opposite direction, the output gear returns to its base position and then moves the worm stem in an opposite direction to a position where the worm stem moves a second leaf spring to break contact with the second switch to turn off the electric motor with the valve in the open position.

* * * * *